Patented Dec. 11, 1928.

1,694,529

UNITED STATES PATENT OFFICE.

ALBERT M. CLIFFORD, OF AKRON, OHIO, ASSIGNOR TO THE GOODYEAR TIRE & RUBBER COMPANY, OF AKRON, OHIO, A CORPORATION OF OHIO.

ANTIOXIDANT OR AGE RESISTER.

No Drawing.    Application filed December 13, 1927.    Serial No. 239,807.

My invention relates to the treatment of rubber and it has, for its primary object, the provision of a material which, when incorporated in a rubber compound acts as an antioxidant or age-retarder.

More specifically, my invention has for one of its objects the provision of an antioxidant or age-retarding material which is especially efficient in rubber goods that are exposed to relatively high temperatures.

Heretofore, various amino bodies have been employed in the treatment of rubber, some of these being particularly efficient as accelerators of the rate of vulcanization. Other compounds of this class, while having comparatively low accelerative power are very effective as antioxidants or age-retarders.

Many of the age-retarders heretofore known are quite efficient at comparatively low temperatures, but are poorly adapted to preserve rubber compounds when the latter are subjected to high temperatures.

I have made the discovery that certain secondary amines in which both of the hydrocarbon radicals are of the same series, when compounded in rubber, act as very effective age-retarders, and certain of them are particularly efficient when employed in rubber compounds subjected to relatively high temperatures, such as that to which the inner tubes of truck tires are subjected. The general formula of a compound of this class may be represented as follows:

$$R-\overset{H}{\underset{|}{N}}-R_1$$

and in these compounds R and $R_1$ are hydrocarbon radicals of the same series, preferably aromatic or aryl. A specific example of a compound falling within the scope of my invention is β—β-dinaphthylamine, a substance having the formula

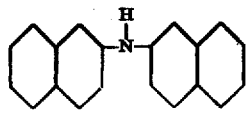

Materials prepared in accordance with the above formula were subjected to cures of thirty minutes, fifty minutes, and one hour and ten minutes, at forty pounds steam pressure. Samples of this material were then subjected to aging tests in an oxygen bomb for six day and twelve day periods. Tabulated below are the results of the aging tests.

β—β-Dinaphthylamine.

ORIGINAL.

| Cure—Mins. at 40 lbs. steam pressure | Tensile strength kgs./cm² | Percent elongation | Load in kgs./cm² | | Percent gain in weight |
|---|---|---|---|---|---|
| | | | 500% elong. | 700% elong. | |
| 30 | 105 | 920 | 12 | 34 | |
| 50 | 140 | 850 | 19 | 61 | |
| 70 | 170 | 810 | 25 | 90 | |

AGED IN AN OXYGEN BOMB AT 50° C. AND UNDER 150 LBS. OXYGEN PRESSURE PER SQ. IN. FOR 6 DAYS.

| 30 | 110 | 885 | 15 | 42 | .1 |
| 50 | 140 | 805 | 23 | 78 | .1 |
| 70 | 170 | 775 | 31 | 114 | .1 |

α—β-Dinaphthylamine aged in oxygen bomb at 50° C.

| Cure—Mins. at 40 lbs. steam pressure | Tensile strength kgs./cm² | Percent elong. | Tensile strength 500% elong. kgs./cm² | Tensile strength 600% elong. kgs./cm² | Tensile strength 700% elong. kgs./cm² | % gain in weight | |
|---|---|---|---|---|---|---|---|
| | | | | | | 6 days | 12 days |
| 30 | 125 | 900 | 14 | 23 | 42 | .10 | .09 |
| 50 | 170 | 820 | 22 | 42 | 86 | .22 | .15 |
| 70 | 185 | 785 | 28 | 56 | 113 | | |

Another compound which also insures excellent results may be prepared in accordance with the following formula:

| | Parts. |
|---|---|
| Smoked sheet rubber | 100.0 |
| Zinc oxide | 94.0 |
| Sulphur | 3.5 |
| Diphenyl guanidine | .7 |
| Antioxidant | 5.0 |

The following table contains the results of tests performed upon a sample of material prepared in accordance with the formula and in which β—β-dinaphthylamine was employed as an antioxidant.

One of the various methods by which this material may be prepared consists in heating β-naphthylamine with about .1 percent to .5 percent of iodine at a temperature of 230° C. for three or four hours. It may also be prepared by heating β-naphthol in an autoclave with zinc-ammonium chloride at about 260° to 290° C. five to eight hours and under a pressure of approximately 600 pounds per square inch. The material may be dissolved in benzene and crystallized out in the form of fine flakes which melt at a temperature of 171° to 172° C. The material is characterized by a blue fluorescence when dissolved in organic solvents and is comparatively insoluble in water.

The alpha-beta form of the dinaphthylamine is also a very efficient antioxidant. This material may also be prepared by various methods. The preferred method, however, consists in treating approximately equi-molecular quantities of β-naphthol and α-naphthylamine with approximately one mol of anhydrous calcium chloride. This material is heated for a period of 8 to 10 hours at a temperature of 260° to 290° C. It is then boiled with water and the aqueous portion is decanted off, thereby removing the calcium salt from the product. The latter may then be further purified by crystallization from benzene.

A third example of a compound which falls within the scope of my invention is the alpha-alpha form of dinaphthyl amine which may be prepared by heating alpha-naphthylamine and alpha-naphthol together in the presence of fused calcium chloride.

The materials which fall within the scope of my invention may, of course, be employed in various rubber compounds. The following is a formula of a compound which insures excellent results:

|  | Parts. |
|---|---|
| Rubber | 100 |
| Zinc oxide | 5 |
| Sulphur | 3 |
| Stearic acid | 1.5 |
| Hexamethylene tetramine | 1 |
| Antioxidant | 1 |

β—β-Dinaphthylamine.
ORIGINAL.

| Cure—Mins. at 40 lbs. steam pressure | Tensile strength kgs./cm² | Per cent elongation | Load in kgs./cm² | |
|---|---|---|---|---|
| | | | 300% elong. | 500% elong. |
| 30 | 125 | 610 | 27 | 75 |
| 50 | 194 | 650 | 34 | 102 |
| 70 | 213 | 655 | 40 | 111 |

AGED 7 HOURS UNDER 80 LBS. PRESSURE PER SQUARE INCH AND AT 236° F.

| 30 | 92 | 610 | 24 | 58 |
| 50 | 136 | 640 | 31 | 78 |
| 70 | 136 | 610 | 37 | 89 |

From the above data it is apparent that relatively small quantities of oxygen were absorbed in each case and this is evidence of the efficiency of the compounds as antioxidants. The age-retarding powers of the compounds are also demonstrated in connection with certain of the compounds by the tensile strength tests to which samples were subjected before and after artificial aging.

Particular attention is directed to β—β-dinaphthylamine which was subjected to an aging test at 80 pounds air pressure and a temperature corresponding to 8 pounds of steam (236° F.) and from the table it is apparent that the compound withstood that severe test with only slight impairment in strength and elasticity.

Although I have described in detail only the preferred embodiments of my invention, it will be apparent to those skilled in the art that it is not so limited, but that various minor modifications may be made therein without departing from the spirit of the invention or from the scope of the appended claims.

What I claim is:

1. A rubber product containing a material having the formula

in which R and $R_1$ are naphthylene radicals.

2. A rubber product containing a material having the formula

in which R and $R_1$ are similar naphthylene radicals.

3. A rubber product containing β—β-dinaphthylamine.

4. A method of preserving rubber which comprises incorporating into a rubber compound a material having the formula

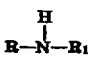

where R and $R_1$ are naphthylene radicals.

5. A method of preserving rubber which comprises incorporating into a rubber compound a material having the formula

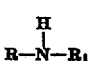

where R and $R_1$ are similar naphthalene radicals.

6. A method of preserving rubber at high temperatures which comprises incorporating into a rubber compound β—β-dinaphthylamine.

7. A method of treating rubber which comprises subjecting it to vulcanization in the presence of an accelerator of vulcanization, and an antioxidant consisting of dinaphthylamine.

8. A method of treating rubber which comprises subjecting it to vulcanization in the presence of an accelerator of vulcanization and β—β-dinaphthylamine.

9. A rubber product that has been vulcanized in the presence of an accelerator of vulcanization and a dinaphthylamine.

10. A rubber product that has been vulcanized in the presence of an accelerator of vulcanization and β—β-dinaphthylamine.

In witness whereof, I have hereunto signed my name.

Signed at Akron, in the county of Summit, and State of Ohio, this 12th day of December, 1927.

ALBERT M. CLIFFORD.

CERTIFICATE OF CORRECTION.

Patent No. 1,694,529.     Granted December 11, 1928, to

ALBERT M. CLIFFORD.

It is hereby certified that error appears in the printed specification of the above numbered patent requiring correction as follows: Page 1, line 47, commencing with the word "Materials" strike out all to and including the word "antioxidant" in line 96, and insert the same to follow after line 47, page 2; and that the said Letters Patent should be read with this correction therein that the same may conform to the record of the case in the Patent Office.

Signed and sealed this 19th day of February, A. D. 1929.

M. J. Moore,
Acting Commissioner of Patents.

(Seal)

8. A method of treating rubber which comprises subjecting it to vulcanization in the presence of an accelerator of vulcanization and β—β-dinaphthylamine.

9. A rubber product that has been vulcanized in the presence of an accelerator of vulcanization and a dinaphthylamine.

10. A rubber product that has been vulcanized in the presence of an accelerator of vulcanization and β—β-dinaphthylamine.

In witness whereof, I have hereunto signed my name.

Signed at Akron, in the county of Summit, and State of Ohio, this 12th day of December, 1927.

ALBERT M. CLIFFORD.

CERTIFICATE OF CORRECTION.

Patent No. 1,694,529.                    Granted December 11, 1928, to

ALBERT M. CLIFFORD.

It is hereby certified that error appears in the printed specification of the above numbered patent requiring correction as follows: Page 1, line 47, commencing with the word "Materials" strike out all to and including the word "antioxidant" in line 96, and insert the same to follow after line 47, page 2; and that the said Letters Patent should be read with this correction therein that the same may conform to the record of the case in the Patent Office.

Signed and sealed this 19th day of February, A. D. 1929.

M. J. Moore,
Acting Commissioner of Patents.

(Seal)